United States Patent [19]
Mohammadi et al.

[11] Patent Number: 5,172,763
[45] Date of Patent: Dec. 22, 1992

[54] STEAM-FOAM DRIVE

[75] Inventors: Shane S. Mohammadi, Tustin; Shlomo R. Frieman, Los Angeles, both of Calif.

[73] Assignee: Union Oil Company of California, Los Angeles, Calif.

[21] Appl. No.: 752,855

[22] Filed: Aug. 30, 1991

[51] Int. Cl.$^5$ .............................................. E21B 43/24
[52] U.S. Cl. ...................................... 166/263; 166/269; 166/272; 166/303; 166/309
[58] Field of Search ............... 166/263, 269, 272, 303, 166/309

[56] References Cited

U.S. PATENT DOCUMENTS

| | | | |
|---|---|---|---|
| 3,357,487 | 12/1967 | Gilchrist et al. | |
| 3,412,794 | 11/1966 | Craighead. | |
| 3,993,133 | 11/1976 | Clampitt | 166/272 |
| 3,994,345 | 11/1976 | Needham | 166/303 |
| 4,086,964 | 5/1978 | Dilgren et al. | 166/272 |
| 4,166,504 | 9/1979 | Brown et al. | 166/263 X |
| 4,247,405 | 1/1981 | Wier | 252/8.554 |
| 4,389,320 | 6/1983 | Clampitt | 252/8.554 |
| 4,392,530 | 7/1983 | Odeh et al. | 166/269 |
| 4,414,120 | 11/1983 | Malloy et al. | 252/8.554 |
| 4,445,573 | 5/1984 | McCaleb | 166/272 X |
| 4,488,976 | 12/1984 | Dilgren et al. | 252/8.554 |
| 4,532,051 | 7/1985 | Nuckels et al. | 252/8.554 |
| 4,536,301 | 8/1985 | Malloy et al. | 252/8.554 |
| 4,540,049 | 9/1985 | Hawkins et al. | 166/272 |
| 4,540,050 | 9/1985 | Huang et al. | 166/272 |
| 4,556,495 | 12/1985 | Shaw | 252/8.554 |
| 4,577,688 | 3/1986 | Gassmann et al. | 166/263 X |
| 4,597,442 | 7/1986 | Dilgren et al. | 166/272 |
| 4,609,044 | 9/1986 | Lau | 166/274 |
| 4,620,594 | 11/1986 | Hall | 166/263 |
| 4,640,355 | 2/1987 | Hong et al. | 166/269 |
| 4,648,455 | 3/1987 | Luke | 166/269 X |
| 4,660,641 | 4/1987 | Shen | 166/272 |
| 4,702,317 | 10/1987 | Shen | 166/272 |
| 4,727,938 | 3/1988 | Lau | 166/270 |
| 4,836,281 | 6/1989 | Robin et al. | 166/272 |
| 4,971,150 | 11/1990 | Sanchez | 166/245 |
| 5,042,583 | 8/1991 | D'Souza et al. | 166/272 |

OTHER PUBLICATIONS

SPE/DOE 12660.
SPE 12784.
SPE 13609.
SPE 15054.
Mohammadi et al., "Characteristics of Steam-Foam Drive Process in Massive Multi-Zone and Thin Single-Zone Reservoirs," Presented at UNITAR/UNDP 5th Int. Conference on Heavy Crude and Tar Sands (Feb. 17-22, 1991) Caracas, Venezuela.

*Primary Examiner*—George A. Suchfield
*Attorney, Agent, or Firm*—Gregory F. Wirzbicki; Shlomo R. Frieman

[57] ABSTRACT

The time delay experienced between the commencement of the steam-foam drive and the subsequent incremental increase in oil production rate is reduced by simultaneously (a) injecting steam into the lower level of a subterranean oil-bearing formation and (b) injecting foam into the upper elevation of the formation. Preferably, the elevation where the foam is injected is gradually lowered while maintaining the steam injection elevation substantially constant. The accelerated response rate improves the economics of the steam-foam drive.

20 Claims, 8 Drawing Sheets

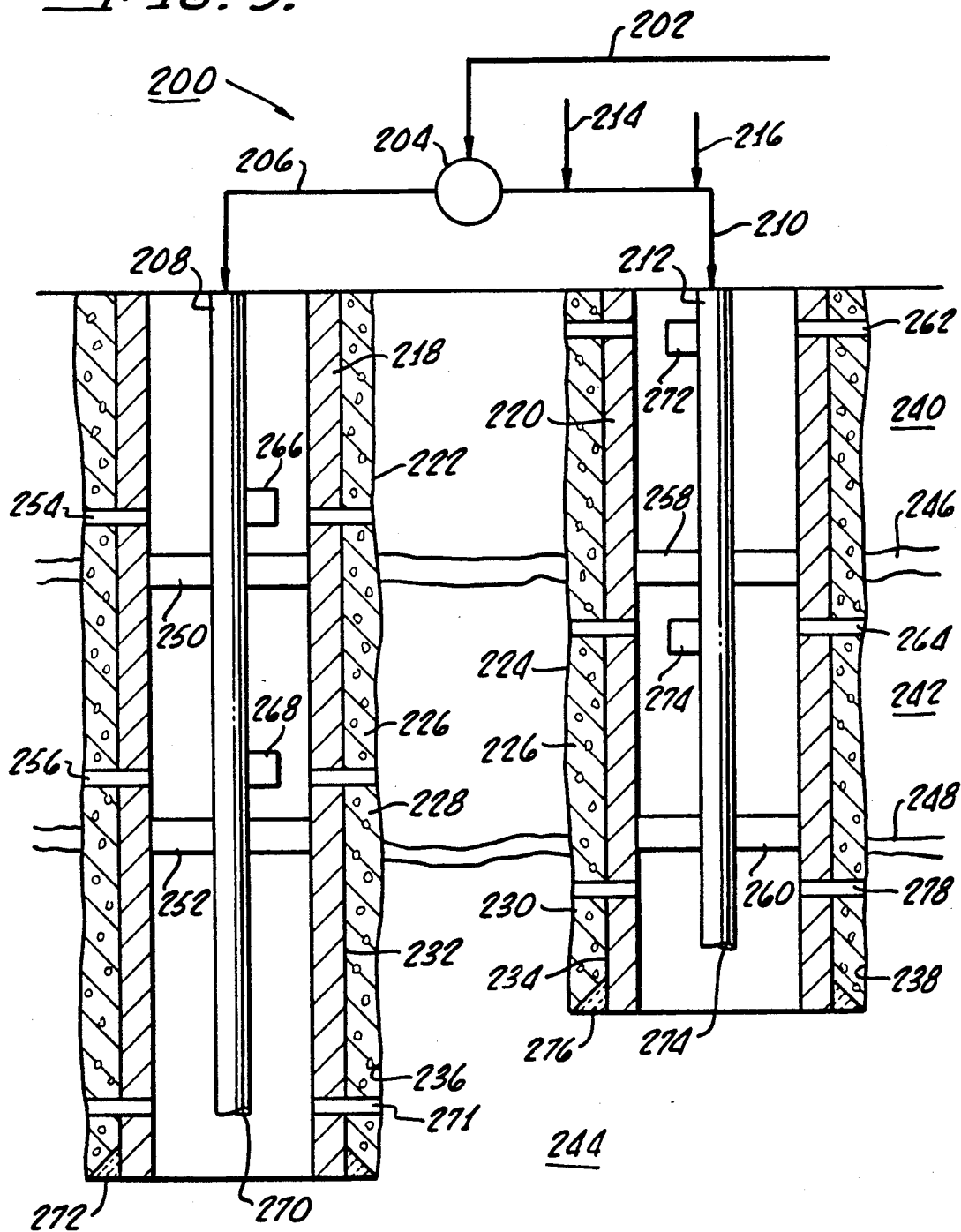

STEAM-FOAM DRIVE

BACKGROUND

The present invention relates to a steam-foam drive.

A steam-foam drive is a common enhanced oil recovery process. Typically, steam is injected into the lower portion of a subterranean oil-bearing formation through an injection well to enhance the production of heavy oil at a producing well. Due to buoyancy forces, steam tends to override the oil saturated zones. At maturity, a steam zone substantially depleted of oil is formed near the top of the formation. The bulk of subsequently injected steam tends to traverse the subterranean formation through the oil depleted steam zone—with a consequent reduction in oil production.

Proximate the time of steam breakthrough at the producing well, a steam-foam drive is initiated by mixing a surfactant and optional ingredients (e.g., noncondensible gases) with the steam and injecting the mixture into the formation at the same location where the steam was previously being injected. The steam-foam drive tends to increase oil production.

SUMMARY

A problem with prior steam-foam drive processes is the time delay experienced between the commencement of the steam-foam drive and the subsequent incremental increase in the oil production rate. The steam-foam drive process of the present invention reduces this time delay—thereby improving the economics of the drive.

In one embodiment of the steam-foam drive of the present invention, the steam-foam drive is conducted by simultaneously (a) injecting steam into at least a portion of a subterranean oil-bearing formation from a steam injection zone located in the lower portion of the subterranean oil-bearing formation while (b) injecting foam into at least a portion of the subterranean oil-bearing formation from a foam injection zone located in the upper portion of the subterranean oil-bearing formation. Preferably, the foam injection zone descends deeper into the subterranean oil-bearing formation over a period of time while substantially maintaining the location of the steam injection zone within the bottom portion of the subterranean oil-bearing formation.

Another embodiment of the invention entails concurrently conducting steam-foam drives in a plurality of subterranean oil-bearing formations separated by substantially steam impervious layers. In this version, the method comprises concurrently treating two or more subterranean oil-bearing formations by simultaneously injecting (a) steam into at least a portion of each treated subterranean oil-bearing formation from respective steam injection zones and (b) foam into at least a portion of each subterranean oil-bearing formation from respective foam injection zones. Each steam injection zone is located in the lower part and each foam injection zone is located in the upper part of the respective subterranean oil-bearing formations.

DRAWINGS

The improved oil production as well as other features, aspects, and advantages of the invention will become better understood with reference to the following description, appended claims, and accompanying drawings wherein:

FIG. 9 is a schematic sectional view of an additional well system embodying features of the present invention.

DETAILED DESCRIPTION OF THE INVENTION

Figure 7:
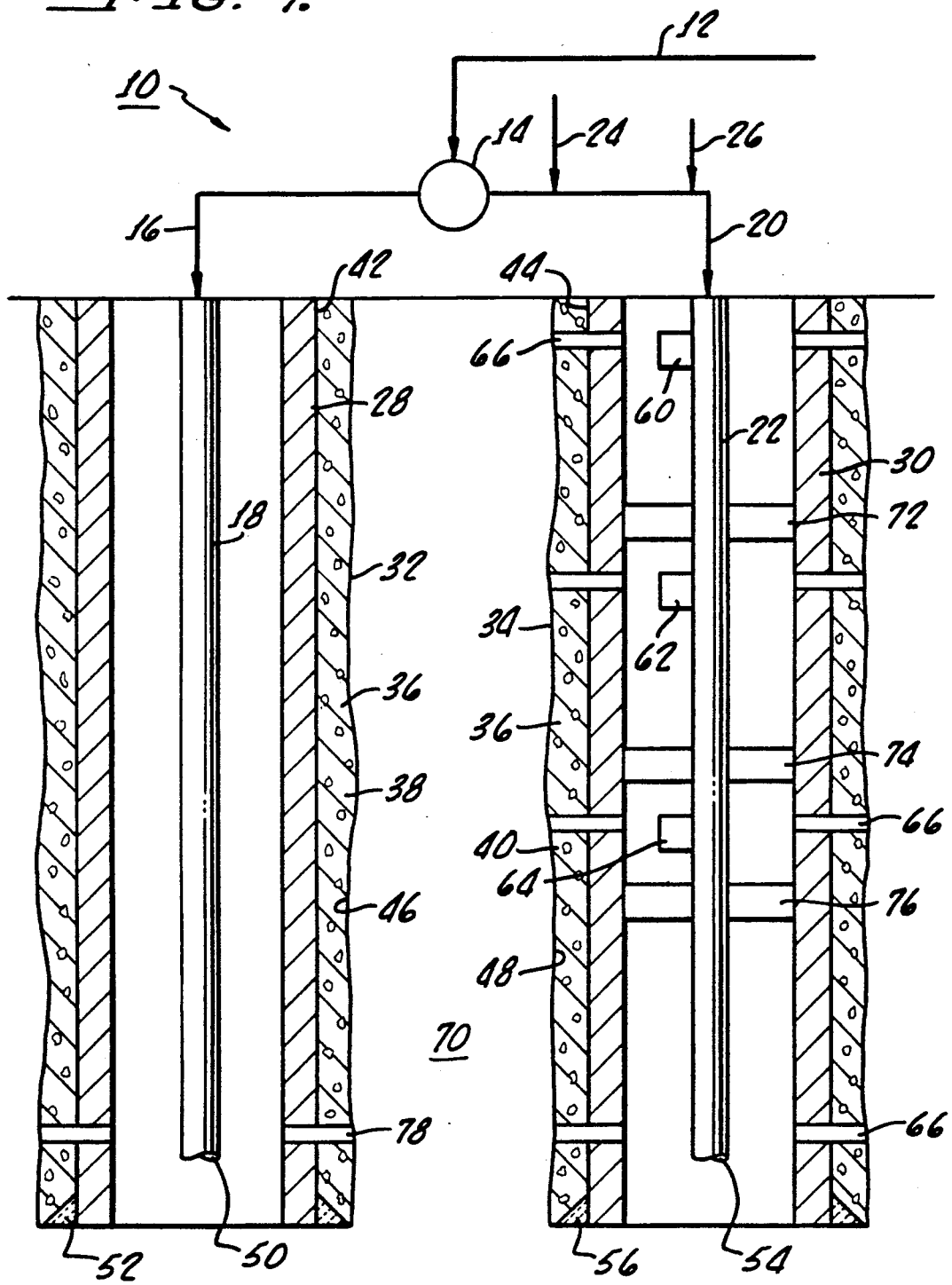
FIG. 7 is a schematic sectional view of a well system embodying features of the present invention.

In accordance with the embodiment of the invention shown in FIG. 7, a steam-foam drive well system 10 comprises a conduit 12 for transporting steam from a steam generator (not shown) to a regulator valve 14. The regulator valve 14 permits desired rates of steam to respectively flow via a conduit 16 into a steam injection tubing 18 and via a conduit 20 into a foam injection tubing 22. Conduits 24 and 26 are in fluid communication with the conduit 20 and respectively transport (a) one or more surfactants and (b) one or more noncondensible gases—thereby enabling the surfactants and noncondensible gases to mix with the steam in the conduit 20.

The steam injection tubing 18 is positioned within a steam injection casing 28 and the foam injection tubing 22 is positioned within a foam injection casing 30. The steam injection casing 28 and the foam injection casing 30 are present in their respective boreholes 32 and 34. The casings 28 and 30 are held in place by cement 36 that substantially fills the annular regions 38 and 40 between the outer surfaces 42 and 44 of respective casings 28 and 30 and the inner surfaces 46 and 48 of the boreholes 32 and 34, respectively.

The steam injection tubing 18 terminates in an opening 50 proximate the casing shoe 52 of the borehole 32. While the foam injection tubing 22 similarly terminates in an opening 54 proximate the casing shoe 56 of the borehole 34, the opening 54 in the foam injection tubing 22 is usually initially closed with a plug (not shown). A plurality of side pocket mandrels 60, 62, and 64, positioned along the length of the foam injection tubing 22 and a plurality of perforations 66 traversing both the foam injection casing 30 and the cement 36 surrounding the foam injection casing 30 are provided to allow foam (not shown) to selectively exit the foam injection tubing 22 and enter a subterranean oil-bearing formation 70. To ensure that the foam enters the subterranean formation 70 at the desired formation depth, packers 72 and 74 are positioned within the foam injection casing 30 between respective pairs of adjacent side pocket mandrels (a) 60 and 62 and (b) 62 and 64. Another packer 76 is placed within the foam injection casing 30 between the side pocket mandrel 64 and the opening 54 in the foam injection tubing 22. The perforations 66 are vertically positioned at preselected vertical distances (e.g., preferably in accordance with geological data obtained while drilling the boreholes 32 and 34).

In accordance with one method embodying features of the present invention, steam is transported through conduit 12 and divided into two separate streams by regulator valve 14. Typically, the ratio of the volumetric flow rate of steam directed to the steam injection tubing 18 via the conduit 16 to the volumetric flow rate of steam directed to the foam injection tubing 22 via the conduit 20 is about 0.1:1 to about 10:1. The preferred steam volumetric flow rate ratio is about 0.5:1 to about 5:1, with the more preferred ratio being about 1:1 to about 2:1.

Steam exiting the opening 50 in the steam injection tubing 18 is injected through perforations 78 into the subterranean formation 70 generally at a location within the bottom half of the vertical height of the formation 70. Preferably, the steam is injected within about the bottom quarter, and more preferably about the bottom 15 percent, of the vertical height of the subterranean formation 70.

With respect to the injection of foam, the amount and types of surfactants and noncondensible gases mixed with the steam to form the foam are well know to those skilled in the art and, accordingly, there is no need to reiterate this material here. See for example, U.S. Pat. No. 4,086,964, U.S. Pat. No. 4,488,976, U.S. Pat. No. 4,597,442, and U.S. Pat. No. 4,702,317, these patents being incorporated in their entireties by reference.

The foam is usually initially injected into the subterranean formation 70 within the top half of the vertical height of the formation 70. More typically, the foam is initially injected into the formation 70 within about the top quarter, and preferably about the top 15 percent, of the vertical height of the subterranean formation 70. For example, the foam is preferably initially injected through side pocket mandrel 60. (Techniques for regulating the flow of fluids through side pocket mandrels are also well known to those skilled in the art.)

Initially injecting the foam within the upper area of the subterranean formation significantly shortens the time delay experienced between the commencement of the steam-foam drive and the subsequent incremental increase in the oil production rate. However, after a period of time, the rate of oil production may decrease. If and when the rate of oil production decreases, the side pocket mandrel 60 is closed and the side pocket mandrel 62 is opened. This maneuver results in another increase in the rate of oil production and is repeatable until the foam is injected into the formation 70 through the lowest perforations 66 in the foam injection casing 30 after removing the plug (not shown) from the opening 54 in the foam injection tubing 22. (Alternatively, instead of removing the plug (not shown), all the steam, surfactant, and noncondensible gas are injected into the formation 70 via the steam injection tubing 18.) Accordingly, the sequential lowering of the foam injection zone increases the rate of oil production.

During the period of time when the foam and steam drive fluids are injected into the subterranean formation 70 at different vertical elevations, generally substantially no foam is injected into the subterranean formation 70 with the steam drive fluid through the steam injection tubing 18. Preferably, virtually no foam is injected into the subterranean formation 70 with the steam drive fluid through the steam injection tubing 18 during this period of time. As used in the specification and claims, the term "substantially no foam" means that the steam drive fluid injected into the subterranean formation contains less than about 0.01 weight percent surfactant and the term "virtually no foam" means that the steam drive fluid injected into the subterranean formation contains less than about 0.0001 weight percent surfactant.

The method of the present invention also more systematically and thoroughly depletes oil from the subterranean formation 70—leaving less oil behind that is economically infeasible to recover due to its scattered presence in the formation 70.

Figure 8:
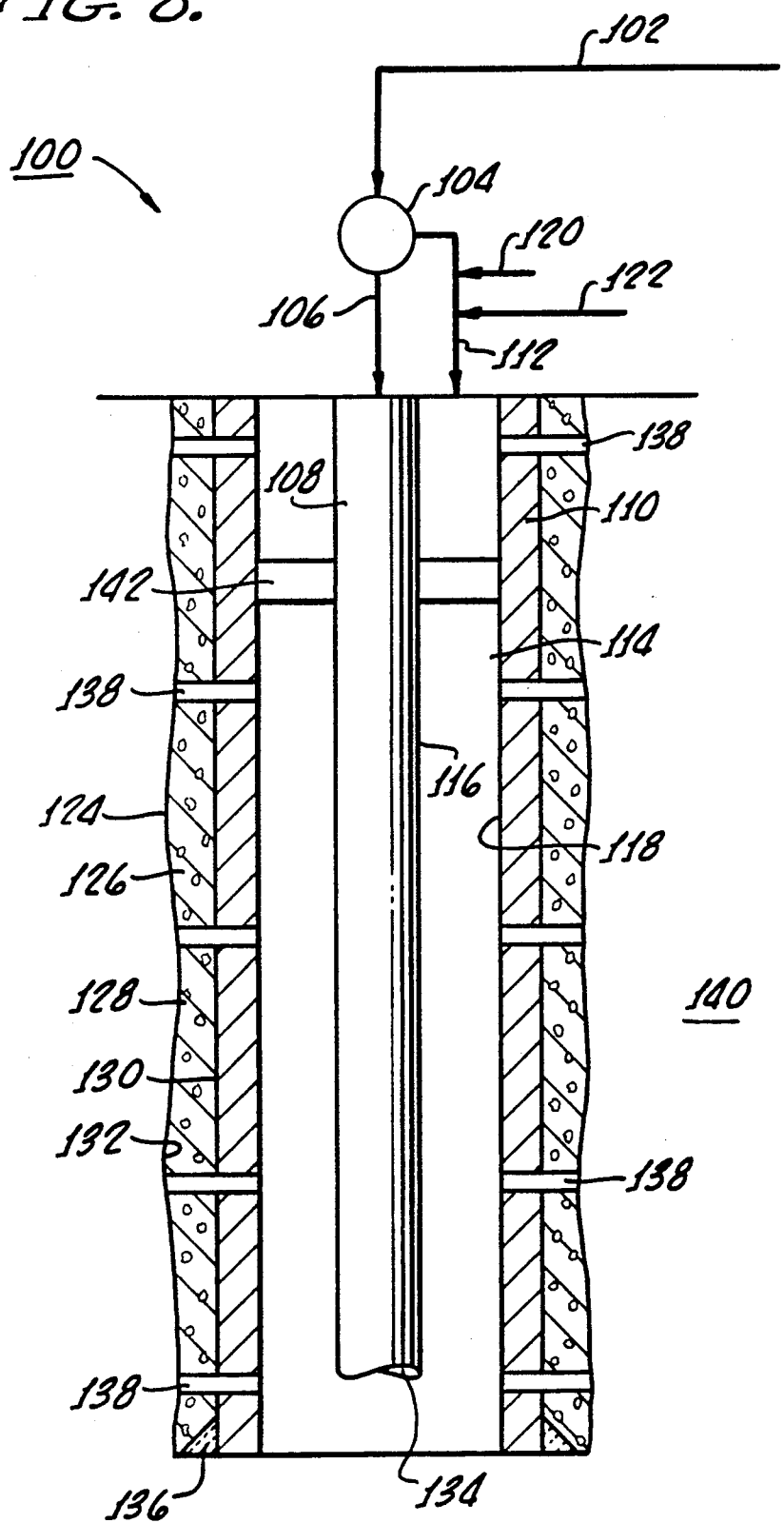
FIG. 8 is a schematic sectional view of another well system embodying features of the present invention.

In another well system 100 embodying features of the present invention as shown in FIG. 8, a conduit 102 transports steam from a steam generator (not shown) to a regulator valve 104. The regulator valve 104 permits a desired rate of steam to flow via a conduit 106 into a steam injection tubing 108 positioned within a casing 110. In addition, the regulator valve 104 allows a desired rate of steam to flow via a conduit 112 into the annular region 114 between the outer surface 116 of the steam injection tubing 108 and the inner surface 118 of the casing 110. Conduits 120 and 122 are in fluid communication with the conduit 112 and respectively transport (a) one or more surfactants and (b) one or more noncondensible gases—thereby enabling the surfactants and noncondensible gases to mix with the steam in the conduit 112.

The casing 110 is present in a borehole 124 and is held in place by cement 126 that substantially fills the annular region 128 between the outer surface 130 of the casing 110 and the inner surface 132 of the borehole 124.

The steam injection tubing 108 terminates in an opening 134 proximate the casing shoe 136 of the borehole 124. A plurality of perforations 138 traversing both the casing 110 and the cement 126 are provided to allow foam (not shown) to selectively exit the casing 110 and enter a subterranean oil-bearing formation 140. To ensure that the foam enters the subterranean formation 140 at the desired formation depth, a packer 142 is positioned within the casing 110 at a preselected depth to force the foam to exit the annular region 114 substantially only through those perforations 138 located vertically above the packer 142.

Using the steam-foam drive system 100 of FIG. 8, steam transported through the conduit 102 is divided by the regulator valve 104 in the ratio noted above. The portion of the steam conveyed by the conduit 106 to the steam injection tubing 108 exits through the opening 134 in the steam injection tubing 108 and is injected into the subterranean formation 140 through the perforations 138 located below the packer 142. A surfactant and a noncondensible gas transported through conduits 120 and 122, respectively, are mixed with the portion of the steam carried by the conduit 112 to the annular region 114 to form foam. The foam is injected into the subterranean formation 140 through the perforations 138 located above the packer 142.

Periodically, the steam and foam injections are interrupted, the steam injection tubing 108 is removed from the casing 110, and the packer 142 is reset at a vertically deeper depth within the formation 140 and below at least one additional set of perforations 138. The steam injection tubing 108 is reinserted into the casing 110 and the steam and foam injections are restarted. The steam and foam now enter the formation 140 through all perforations 138 located vertically below and above, respectively, the repositioned packer 142. Because foam is present in the formation 140 proximate the vertically higher perforations 138, the foam tends to exit the lower perforations 138 now exposed to the foam as a result of resetting the packer 142. This cycle is repeated as often and as frequently as desired. Eventually, the foam is allowed to exit the annular region 114 proximate the casing shoe 136 of the borehole 124.

One method for preventing the steam from being injected into the formation 140 at higher elevations is to initially only perforate the casing 110 and the cement 126 below the initial planned packer location at the level where steam injection is desired. When the steam injection tubing 108 is removed and prior to resetting the packer 142, additional perforations 138 are made in the casing 110 and the cement 126 to permit foam to enter the formation 140 at elevations lower than the original perforations 138, yet above the reset packer 142. This sequence is then repeated prior to each resetting of the packer 142.

The steam-foam drive well system 200 illustrated in FIG. 9 is preferred for use when two or more distinct subterranean formations are present. In particular, the well system 200 comprises a conduit 202 for transporting steam from a steam generator (not shown) to a regulator valve 204. The regulator valve 204 permits desired rates of steam to respectively flow via a conduit 206 into a steam injection tubing 208 and via a conduit 210 into a foam injection tubing 212. Conduits 214 and 216 are in fluid communication with the conduit 210 and respectively transport (a) one or more surfactants and (b) one or more noncondensible gases—thereby enabling the surfactants and noncondensible gases to mix with the steam in the conduit 210.

The steam injection tubing 208 is positioned within a steam injection casing 218 and the foam injection tubing 212 is positioned within a foam injection casing 220. The steam injection casing 218 and the foam injection casing 220 are present in their respective boreholes 222 and 224, the casings 218 and 220 being held in place by cement 226 that substantially fills the annular regions 228 and 230 between the outer surfaces 232 and 234 of respective casings 218 and 220 and the inner surfaces 236 and 238 of the boreholes 222 and 224, respectively.

Three distinct subterranean oil-bearing formations 240, 242, and 244 are traversed by both boreholes 222 and 224 and their respective casings 218 and 220. The top subterranean oil-bearing formation 240 is substantially separated from the middle subterranean oil-bearing formation 242 by a steam-impervious formation (e.g., shale) 246, and the middle subterranean oil-bearing formation 242 is substantially separated from the bottom subterranean oil-bearing formation 244 by another steam-impervious formation 248.

Based upon geological data (e.g., obtained while drilling boreholes 222 and 224 and subsequent well loggings), packers 250 and 252 are vertically positioned within the steam injection casing 218 proximate the depths of the steam-impervious formations 246 and 248, respectively. Above the packer 250 is a set of perforations 254 traversing the steam injection casing 218 and the surrounding cement 226 and above the packer 252 is another set of perforations 256 also traversing the steam injection casing 218 and the surrounding cement 226. Similarly, packers 258 and 260 are vertically positioned within the foam injection casing 220 proximate the depths of the steam-impervious formations 246 and 248, respectively, and separate sets of perforations 262 and 264 traversing both the foam injection casing 220 and the surrounding cement 226 are positioned above their respective packers 258 and 260.

Side pocket mandrels 266 and 268 are located along the steam injection tubing 208 within the region of the top subterranean formation 240 and within the region of the middle subterranean formation 242, respectively. These side pocket mandrels 266 and 268 permit steam to exit the steam injection tubing 208 and enter lower portions of the top and middle formations 240 and 242 through respective set of perforations 254 and 256. In addition, steam exiting an opening 270 proximate the casing shoe 272 of the borehole 222 enters the lower portion of the bottom formation 244 through a set of perforations 271 above the casing shoe 272.

In a similar manner, side pocket mandrels 272 and 274 are located along the foam injection tubing 212 within the region of the top and middle subterranean formations 240 and 242, respectively. These side pocket mandrels 272 and 274 permit foam to exit the foam injection tubing 212 and enter upper elevations of the top and middle formations 240 and 242 through respective set of perforations 262 and 264. In addition, foam leaving an opening 274 proximate the casing shoe 276 of the borehole 224 is injected into the upper elevation of the bottom formation 244 through a set of perforations 278 above the casing shoe 276.

EXAMPLES

The following examples, which are intended to illustrate—and not limit the invention—are computer simulations. The program employed in running these simulations is STARS version 4.0, available from the Computer Modelling Group, Calgary, Canada and the formulas and parameters used in the simulations are discussed in Mohammadi et al, "Characteristics of Steam-Foam Drive Processes in Massive Multi-Zone and Thin Single Zone Reservoirs," presented at UNITAR-/UNDP 5th International Conference on Heavy Oil and Tar Sands, Caracas, Venezuela (Feb. 17-22, 1991), page 9, line 1 to page 10, last line, and Tables 1-2 (Mohammadi), the entire Mohammadi presentation being incorporated herein by reference.)

EXAMPLES 1-2

Prior Art Steam and Steam-Foam Drives

A computer simulation of a steam drive (SD) was made using the premise that steam was injected into a lower level of a theoretical oil-bearing subterranean formation for a period of ten years. For the prior art steam-foam drive (SFD1), the computer simulation used the premise that steam was injected into the same lower level of the identical theoretical oil-bearing formation for a period of five years and immediately followed by the injection of a steam-foam mixture, at the same formation depth, over the next 5 year period.

Figure 1:
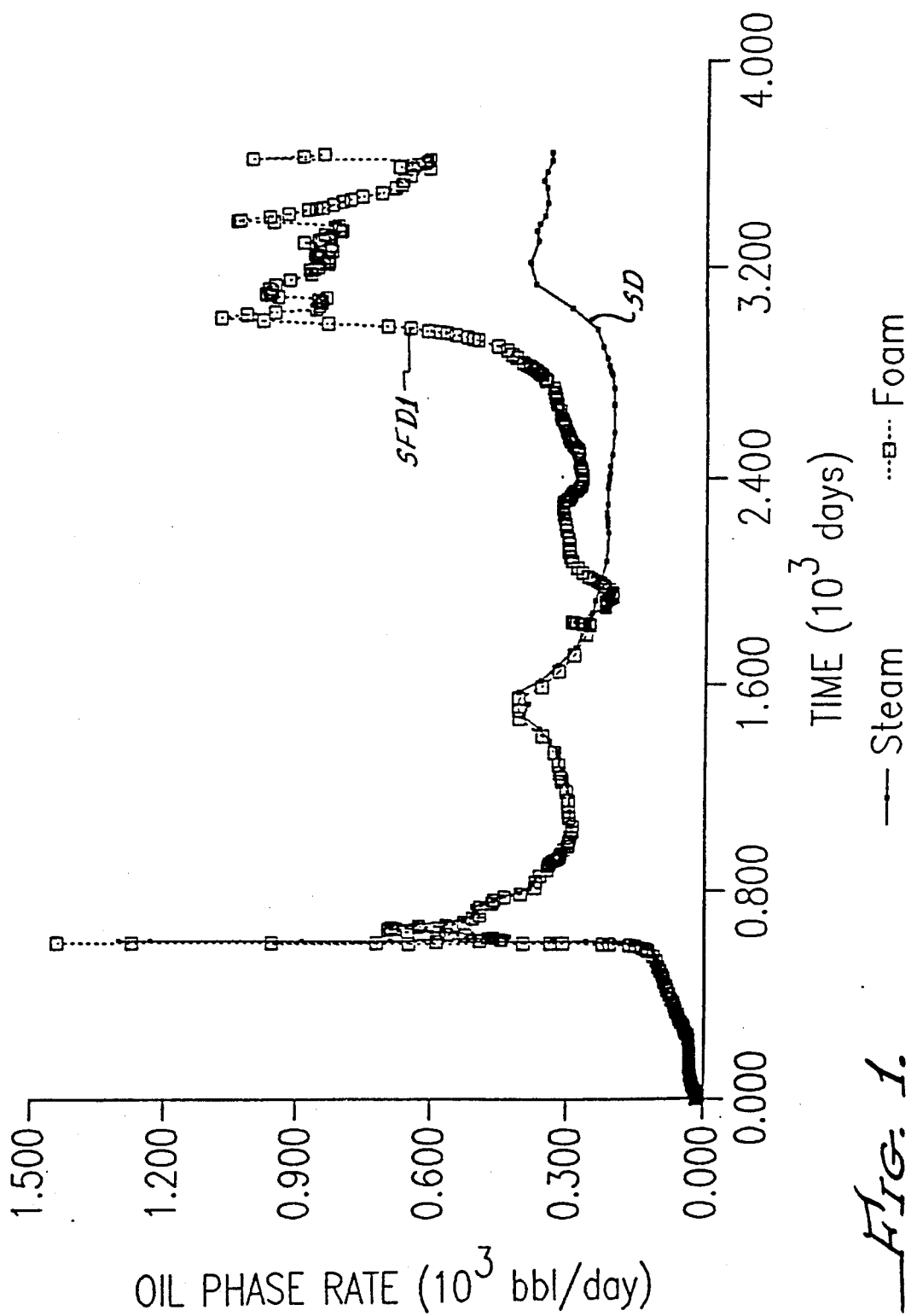
FIG. 1 is a graph comparing oil produced from computer simulations of a steam drive (SD) and a prior art steam-foam drive (SFD1).
Figure 4A:
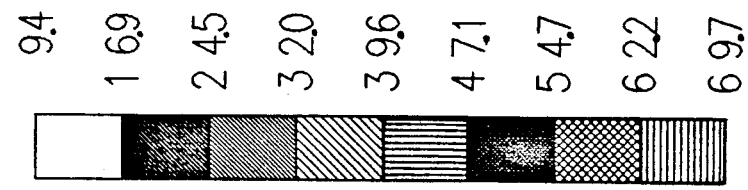
FIG. 4a is a legend depicting percent oil saturation employed in FIGS. 4–6.
Figure 4:
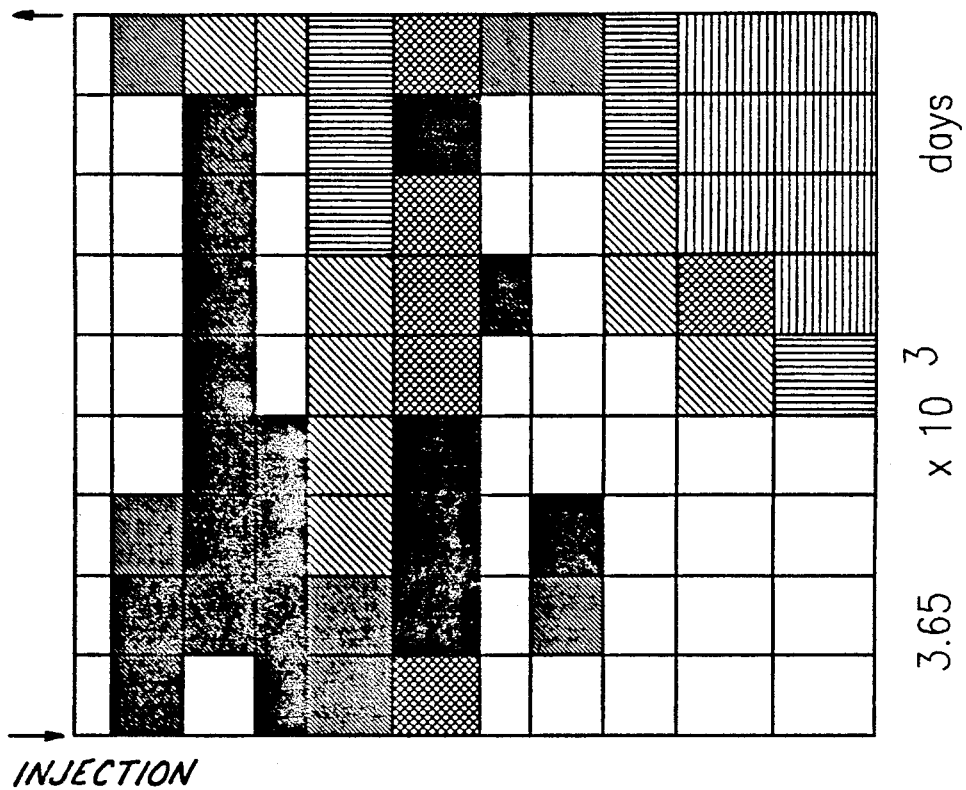
FIG. 4 is a cross-sectional view between an injection well and a producing well of a computer generated simulation for SFD1. The area is divided into a grid depicting percent oil saturation distribution after ten years.

As shown in FIG. 1, a time delay occurred between the commencement of the steam-foam drive and a subsequent incremental increase in the oil production rate. The concentration of oil present in the subterranean formation after SFD1 is schematically shown in FIG. 4.

EXAMPLE 3

Based upon the identical theoretical oil-bearing formation treated by SFD1, a computer simulation was run for a steam-foam drive (SFD2) embodying features of the present invention. For SFD2, the computer simulation used the premise that steam was injected into same lower level of the formation for a period of five years and immediately followed by the injection of a foam drive fluid proximate the top level, while continuing the injection of a steam drive fluid at the lower level, of the subterranean formation over the next 5 year period. In SFD2, the ratio of the volumetric flow rate of steam employed to form the steam drive fluid to the volumetric flow rate of steam employed to form the foam drive fluid was about 1:1.

Figure 2:
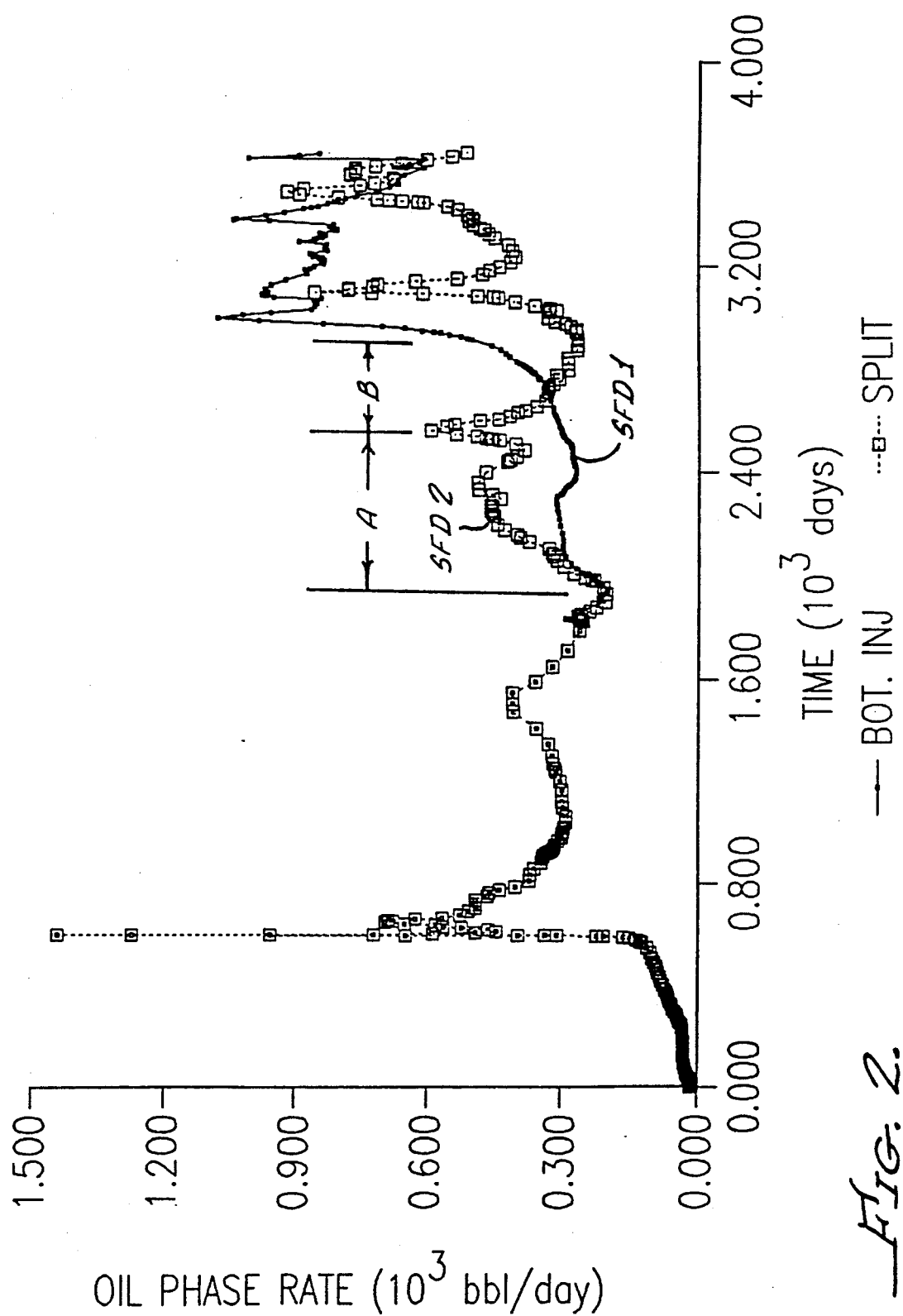
FIG. 2 is a graph comparing oil produced from SFD1 and a computer simulation of a steam-foam drive (SFD2) embodying features of the present invention.

As indicated by region A in FIG. 2, initially injecting the foam within the upper elevation of the subterranean formation significantly shortened the time delay experienced between the commencement of the steam-foam drive and the subsequent incremental increase in the oil production rate. However, after a period of time, the rate of oil production declined as indicated by region B in FIG. 2. (This decline is preventable as indicated in the following Example 4.)

Figure 5:
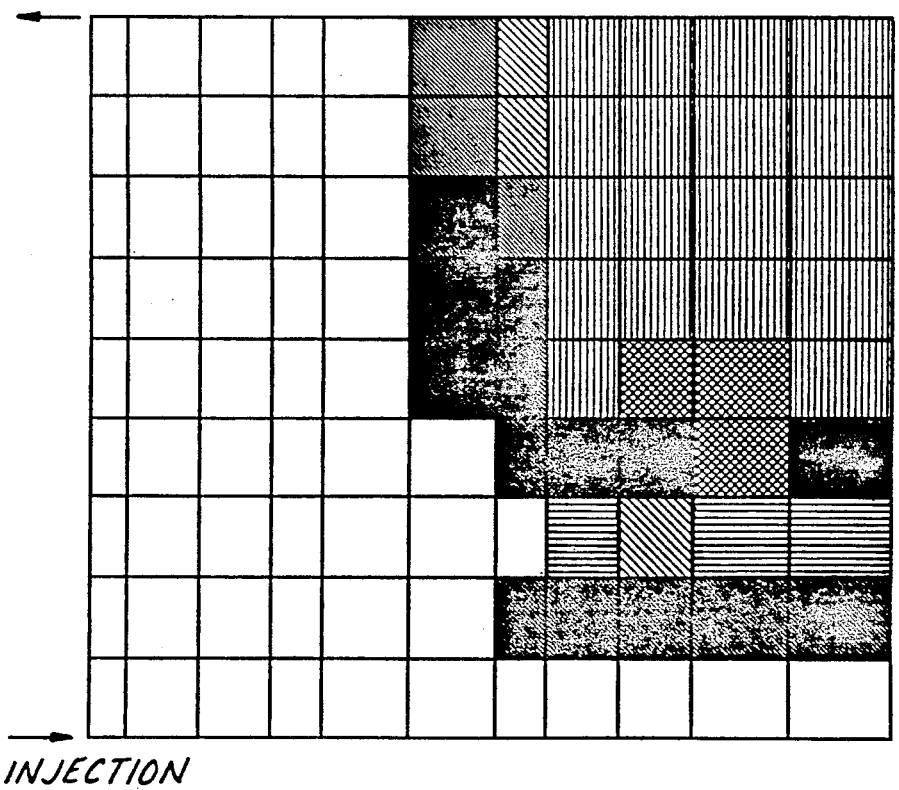
FIG. 5 is a cross-sectional view between an injection well and a producing well of a computer generated simulation for SFD2. The area is divided into a grid depicting percent oil saturation distribution after ten years.

FIGS. 4-5 show that SFD2, in comparison to the prior art SFD1, more systematically and thoroughly depletes oil from the subterranean formation—leaving less oil behind that is economically infeasible to recover due to its scattered presence in the formation.

EXAMPLE 4

Based upon the identical theoretical oil-bearing formation treated by SFD1, a computer simulation was run for another steam-foam drive (SFD3) embodying features of the present invention. For SFD3, the computer simulation used the premise that steam was injected into same lower level of the formation for a period of five years and immediately followed by the injection of a foam drive fluid proximate the top level, while continuing the injection of a steam drive fluid at the lower level, of the subterranean formation over the next 775 day period. At the conclusion of the 775 day period, the injection of the steam drive fluid was discontinued and the foam drive fluid was immediately switched to a lower elevation in the formation as well as to the level at which the steam drive fluid was previously being injected. This injection configuration was maintained for the remainder of the 10 year simulation period. Throughout the 775 day period, the ratio of the volumetric flow rate of steam employed to form the steam drive fluid to the volumetric flow rate of steam employed to form the foam drive fluid was about 1:1. After the 775 day period the ratio of the volumetric flow rate of foam injected into the upper elevation to the volumetric flow rate of foam injected into the lower elevation was about 1:1.

Figure 3:
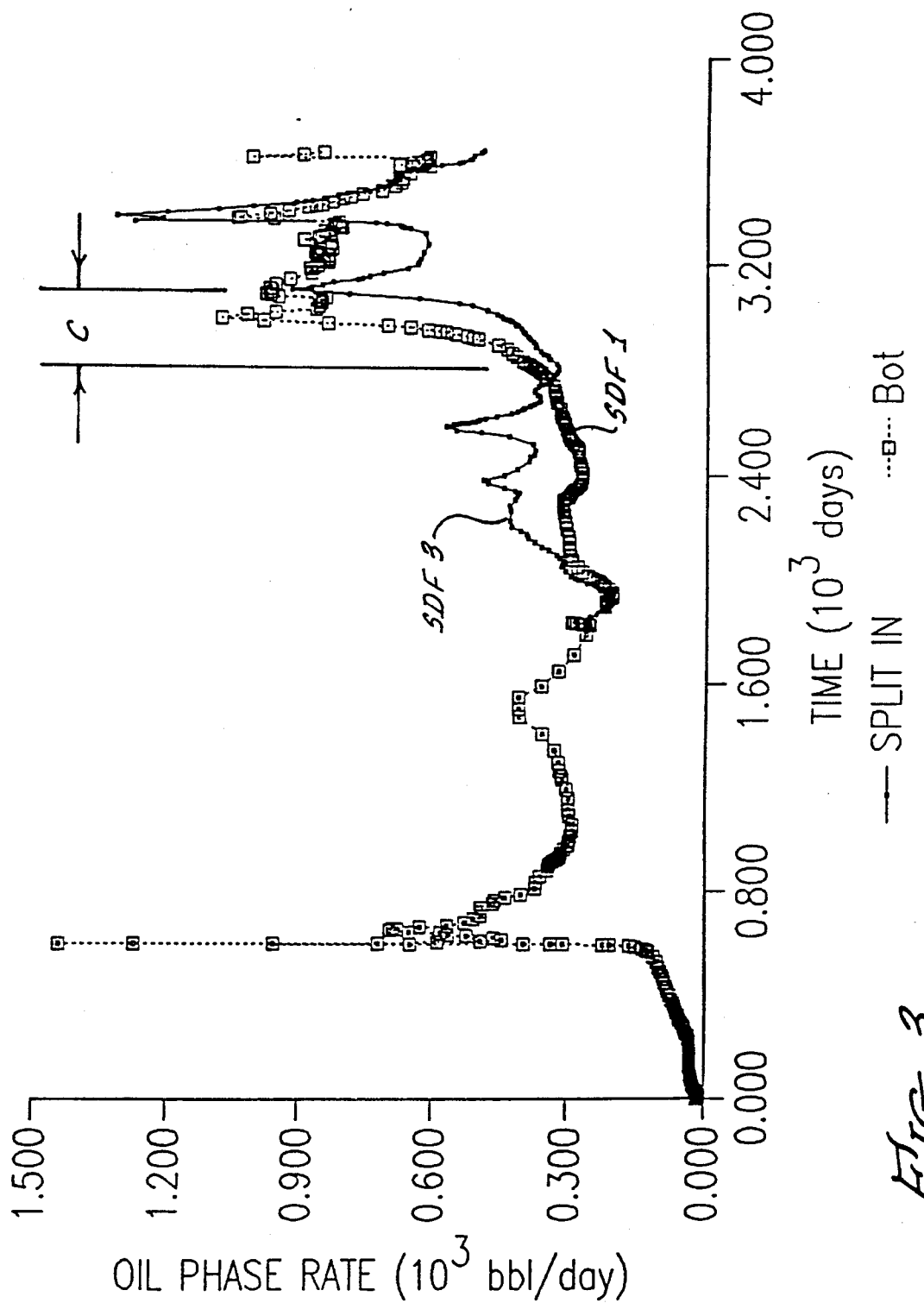
FIG. 3 is a graph comparing oil produced from SFD1 and a computer simulation of another steam-foam drive (SFD3) embodying features of the present invention.

As indicated by region C in FIG. 3, periodically lowering the elevation where foam is injected into the formation results in additional increases in the rate of oil production.

Figure 6:
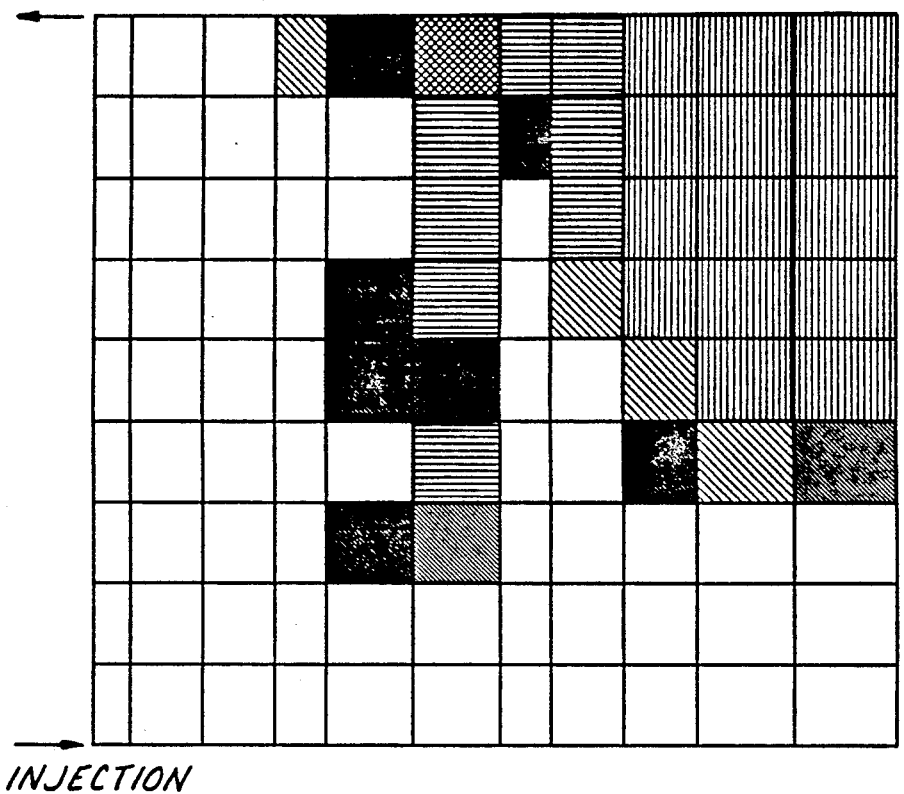
FIG. 6 is a cross-sectional view between an injection well and a producing well of a computer generated simulation for SFD3. The area is divided into a grid depicting percent oil saturation distribution after ten years.

A comparison of FIGS. 4 and 6 indicates that SFD3 more systematically and thoroughly depletes oil from the subterranean formation than the prior art SFD1—leaving less oil behind that is economically infeasible to recover due to its scattered presence in the formation.

Although the present invention has been described in considerable detail with reference to certain preferred versions, other embodiments are possible. For example, other ingredients (e.g., polymers) in addition to surfactants and noncondensible gases are injectable into the foam-forming steam conduit. In addition, a noncondensible gas need not always be employed. Furthermore, the foam can be initially, as well as subsequently, injected into the subterranean oil-bearing formation at any elevation above where the steam is being injected. Therefore, the spirit and scope of the appended claims should not necessarily be limited to the description of the preferred versions contained herein.

What is claimed is:

1. A steam-foam drive method comprising the steps of simultaneously (a) injecting steam into at least a portion of a subterranean oil-bearing formation from a steam injection zone located within the subterranean oil-bearing formation while (b) injecting foam into at least a portion of the subterranean oil-bearing formation from a foam injection zone located in a subterranean oil-bearing formation at an elevation above the steam injection zone and periodically (c) lowering the foam injection zone while substantially maintaining the elevation of the steam injection zone constant.

2. The steam-foam drive of claim 1 wherein during step (a) the steam injection zone is located in at least a portion of the bottom half of the subterranean oil-bearing formation and during step (b) the foam injection zone is located in at least a portion of the top half of the subterranean oil-bearing formation.

3. The steam-foam drive of claim 1 wherein during step (a) the steam injection zone is located in at least a portion of the bottom quarter of the subterranean oil-bearing formation and during step (b) the foam injection zone is located in at least a portion of the top quarter of the subterranean oil-bearing formation.

4. The steam-foam drive of claim 1 wherein during step (a) the steam injection zone is located in at least a portion of the bottom 15 percent of the subterranean oil-bearing formation and during step (b) the foam injection zone is located in at least a portion of the top 15 percent of the subterranean oil-bearing formation.

5. The steam-foam drive of claim 1 further comprising the step of periodically lowering the foam injection zone while substantially maintaining the location of the steam injection zone within the bottom 15 percent of the subterranean oil-bearing formation.

6. The steam-foam drive of claim 5 further comprising the step of lowering the foam injection zone into at least a portion of the bottom half of the subterranean oil-bearing formation while substantially maintaining the location of the steam injection zone within the bottom 15 percent of the subterranean oil-bearing formation and below the foam injection zone.

7. The steam-foam drive of claim 6 further comprising the step of lowering the foam injection zone into at least a portion of the bottom half of the subterranean oil-bearing formation while substantially maintaining the location of the steam injection zone within the bottom 15 percent of the subterranean oil-bearing formation and positioning the foam injection zone in the subterranean oil-bearing formation at substantially the same depth as the steam injection zone.

8. The method of claim 1 wherein the foam comprises a steam-containing foam and the ratio of the volumetric rate of steam injected into the subterranean oil-bearing formation through the steam injection zone to the volumetric rate of steam injected into the subterranean oil-bearing formation through the foam injection zone is about 0.1:1 to about 10:1.

9. The method of claim 1 wherein the foam comprises a steam-containing foam and the ratio of the volumetric rate of steam injected into the subterranean oil-bearing formation through the steam injection zone to the volumetric rate of steam injected into the subterranean oil-bearing formation through the foam injection zone is about 0.5:1 to about 5:1.

10. The method of claim 1 wherein the foam comprises a steam-containing foam and the ratio of the volumetric rate of steam injected into the subterranean oil-bearing formation through the steam injection zone to the volumetric rate of steam injected into the subterranean oil-bearing formation through the foam injection zone is about 1:1 to about 2:1.

11. The method of claim 1 wherein substantially no foam is being injected into the subterranean oil-bearing formation through the steam injection zone.

12. The method of claim 1 wherein virtually no foam is being injected into the subterranean oil-bearing formation through the steam injection zone.

13. The method of claim 1 wherein the foam injection step includes the step of injecting a noncondensible gas into at least a portion of the subterranean formation through the foam injection zone.

14. The method of claim 1 wherein the steam injection step includes the step of injecting the steam into a steam injection well that traverses at least a portion of the subterranean oil-bearing formation and out the steam injection zone, the steam injection zone being in fluid communication with the steam injection well, and the foam injection step includes the step of injecting the foam into a foam injection well that traverses at least a portion of the subterranean oil-bearing formation and out the foam injection zone, the foam injection zone being in fluid communication with the foam injection well.

15. The method of claim 1 wherein the steam injection step includes the step of injecting the steam into a tube and out the steam injection zone, the steam injection zone being in fluid communication with the tubing and the tubing being positioned within the casing of an injection well that traverses at least a portion of the subterranean oil-bearing formation, and the foam injection step includes the step of injecting the foam into the annular region between the inside of the casing and the outside of the tubing and out the foam injection zone, the foam injection zone being in fluid communication with annular region.

16. The method of claim 1 further comprising the step of substantially stopping the injection of the steam into the subterranean formation and injecting the foam at a plurality of elevations within the subterranean formation.

17. A method for concurrently conducting steam-foam drives in a plurality of subterranean oil-bearing formations, adjacent subterranean oil-bearing formations being separated by a substantially steam impervious layer, the method comprising the steps of concurrently treating at least two of the subterranean oil-bearing formations by simultaneously (a) injecting steam into at least a portion of each subterranean oil-bearing formation from respective steam injection zones, each steam injection zone being located in at least a portion of the lower half of the respective subterranean oil-bearing formation while (b) injecting foam into at least a portion of each subterranean oil-bearing formation from respective foam injection zones, each foam injection zone being located in at least a portion of the upper half of the respective subterranean oil-bearing formation, and (c) periodically lowering the foam injection zone in at least one of the subterranean oil-bearing formations while substantially maintaining the elevation of the steam injection zone in the respective subterranean oil-bearing formation constant.

18. The method of claim 17 wherein each steam injection zone is located in at least a portion of a segment of a steam injection well that at least partially traverses the respective subterranean oil-bearing formation and each foam injection zone is located in at least a portion of a foam injection well that at least partially traverses the upper half of the respective subterranean oil-bearing formation.

19. The method of claim 17 wherein a steam injection well and a foam injection well each penetrate a plurality of the subterranean oil-bearing zones, a plurality of the steam injection zones are located along the steam injection well, each steam injection zone located along the steam injection well being positioned along at least a portion of the respective segment that at least partially traverses the respective subterranean oil-bearing formation, and a plurality of the foam injection zones are located along the foam injection well, each foam injection zone located along the foam injection well being positioned along at least a portion of the respective segment that at least partially traverses the respective subterranean oil-bearing formation.

20. A steam-foam drive method comprising the steps of simultaneously (a) injecting steam into at least a portion of a subterranean oil-bearing formation from a steam injection zone located within the subterranean oil-bearing formation while (b) injecting a steam-containing foam into at least a portion of the subterranean oil-bearing formation from a foam injection zone located in the subterranean oil-bearing formation at an elevation above the steam injection zone and further comprising the step (c) of periodically lowering the foam injection zone while substantially maintaining the elevation of the steam injection zone constant.

* * * * *